United States Patent
Huang et al.

(10) Patent No.: US 9,086,552 B2
(45) Date of Patent: Jul. 21, 2015

(54) OPTICAL MODULE

(71) Applicants: HISENSE BROADBAND MULTIMEDIA TECHNOLOGIES CO., LTD., Qingdao (CN); HISENSE USA CORPORATION, Suwanee, GA (US)

(72) Inventors: Yungliang Huang, Qingdao (CN); Yicheng Liu, Qingdao (CN)

(73) Assignees: Hisense Broadband Multimedia Technologies Co., Ltd., Shandong (CN); Hisense USA corporation, Suwanee, GA (US)

( * ) Notice: Subject to any disclaimer, the term of this patent is extended or adjusted under 35 U.S.C. 154(b) by 0 days.

(21) Appl. No.: 14/197,146

(22) Filed: Mar. 4, 2014

(65) Prior Publication Data

US 2014/0301703 A1   Oct. 9, 2014

(30) Foreign Application Priority Data

Apr. 8, 2013   (CN) .................. 2013 2 0170069 U (51) Int. Cl.
*G02B 6/42* (2006.01)
*G02B 6/36* (2006.01)

(52) U.S. Cl.
CPC ............. *G02B 6/423* (2013.01); *G02B 6/428* (2013.01); *G02B 6/4214* (2013.01); *G02B 6/4244* (2013.01); *G02B 6/4204* (2013.01); *G02B 6/4219* (2013.01); *G02B 6/4249* (2013.01); *G02B 6/4292* (2013.01)

(58) Field of Classification Search
USPC ........................................................ 385/77
See application file for complete search history.

(56) References Cited

U.S. PATENT DOCUMENTS

| | | | |
|---|---|---|---|
| 2004/0057253 A1* | 3/2004 | DeCusatis et al. | 362/581 |
| 2006/0274997 A1 | 12/2006 | Furuno et al. | 385/89 |
| 2013/0129281 A1* | 5/2013 | Son et al. | 385/33 |
| 2014/0086532 A1* | 3/2014 | Droesbeke et al. | 385/39 |
| 2014/0178009 A1* | 6/2014 | Ko et al. | 385/77 |

FOREIGN PATENT DOCUMENTS

| | | |
|---|---|---|
| CN | 203164482 U | 8/2013 |
| WO | 2012/036530 A2 | 3/2012 |
| WO | 2012/065864 A1 | 5/2012 |

OTHER PUBLICATIONS

The extended European Search Report, including European Search Opinion of corresponding European patent application No. 14157643.9, dated Jul. 21, 2014.

* cited by examiner

*Primary Examiner* — Eric Wong
(74) *Attorney, Agent, or Firm* — J.C. Patents (57) ABSTRACT

An optical module, including a PCB, an optical component arranged on the PCB, and an optical fiber coupled with the optical component through an optical lens module, further including a fixed bracket, a lens bracket detachably connected with the fixed bracket, and a fiber bracket detachably connected with the lens bracket, the fixed bracket is fixed on the PCB, the optical lens module is arranged on the lens bracket, the optical fiber is arranged on the fiber bracket, and the optical component is located between the fixed bracket and the lens bracket, the fixed bracket is provided with at least two positioning parts, the lens bracket is provided with positioning parts matching respectively the positioning parts of the fixed bracket to achieve detachable connection. The optical path coupling is achieved through the mechanical fixation among multiple brackets, working process is simplified, and coupling consistency and accuracy are improved.

15 Claims, 5 Drawing Sheets

OPTICAL MODULE

CROSS-REFERENCE TO RELATED APPLICATIONS

This application claims priority to Chinese Patent Application No. 201320170069.X, filed on Apr. 8, 2013, entitled "OPTICAL MODULE", which is hereby incorporated by reference in its entirety.

TECHNICAL FIELD

The present invention relates to optical communication technologies and, in particular, to an optical module.

BACKGROUND

In existing optical communication technologies, reliable information transmission with high speed and long hours is conducted by using optical signals as carriers of information. The coupling effect of optical components and transmission paths (optical fibers) in an optical module as a core component in the field of optical communications, greatly affects the strength and quality of the optical signals, and thus becomes one of the key factors affecting the information transmission.

Currently, the method of achieving the optical path coupling of the optical components and transmission fibers in the optical module includes active coupling and passive coupling.

The process of the active coupling method includes: fixing a laser which serves as a light source on a PCB, then controlling the laser to emit light, adjusting, by using a coupler, the spatial position of an optical lens module which is used as a device for changing the optical transmission path, and detecting the light intensity which is coupled to the optical fiber by this module, and when the light intensity output by the optical fiber reaches a maximum, determining the position of the lens at this time as the optimal coupling position.

The process of the passive coupling method includes: first fixing the laser, and then acquiring images of the laser and the optical lens module respectively by using two cameras, transferring the images to a PC, adjusting the position of the lens, and when centers of the two images overlap, determining the position of the lens at this time as the optimal coupling position.

A special coupler needs to be used if the active coupling method is adopted, and two cameras need to be used if the passive coupling method is adopted, which result in that prices of the devices used for coupling are relatively high, and the working processes are complicated. Moreover, the UV glue needs to be used for fixing after the optimal coupling position is found for both the active coupling method and the passive coupling method. The UV glue is cured fast by ultraviolet ray irradiation; as its strength is relatively low, the glue then is used to perform high temperature curing. Because the laser, the optical lens module and the optical fiber, which constitute the optical path, are not mechanically fixed with high strength with respect to each other, it is very possible that the optical lens module deviates from the coupling position during the manual operations before the black glue curing, thereby resulting in a poor coupling effect of the optical path.

SUMMARY

One of the purposes of the invention is to provide an optical module having a plurality of brackets, this module achieves the optical path coupling through the mechanical fixation among a plurality of brackets, the working process is simplified, the coupling cost is reduced, and the coupling consistency and accuracy are improved.

In order to achieve the above technical purpose, the technical solutions of an optical module are provided in the present invention as follows:

An optical module, including a PCB, an optical component arranged on the PCB, an optical fiber which is coupled with the optical component through an optical lens module, where the optical module further includes a fixed bracket, a lens bracket which is detachably connected to the fixed bracket, and a fiber bracket which is detachably connected to the lens bracket, the fixed bracket is fixed on the PCB, the optical lens module is arranged on the lens bracket, the optical fiber is arranged on the fiber bracket, and the optical component is located between the fixed bracket and the lens bracket, the fixed bracket is provided with at least two positioning parts, the lens bracket is correspondingly provided with positioning parts which match respectively the positioning parts of the fixed bracket to achieve detachable connection.

Preferably, in order to simplify the structure of the optical module, the two positioning parts of the fixed bracket are respectively arranged at left and right sides of the fixed bracket, the lens bracket is provided with two positioning parts corresponding one-to-one to the positioning parts of the fixed bracket, and the two positioning parts of the lens bracket are located respectively at left and right sides of a first optical lens module which is arranged on the lens bracket and corresponds to the optical component.

For the optical module as described above, in order to increase the contact area of the glue and improve the fixing performance, the fixed bracket is provided with a plurality of notches at least at its left and right side edges.

Preferably, the plurality of notches are intermittently and uniformly distributed at both left and right side edges of the fixed bracket.

For the optical module as described above, in order to prevent the redundant glue from penetrating to the bottom of the bracket and thereby producing bulges, an accommodating groove is arranged at the bottom of the fixed bracket and adjacent to the notches.

For the optical module as described above, in order to facilitate the stable fixation of the lens bracket, the lens bracket is provided with a plurality of injection holes.

Preferably, the upper portion of the injection holes is a stepped groove, the lower portion of the injection holes is a bell mouth, and there is a vertical transition part between the bottom end of the stepped groove and a small opening of the upper end of the bell mouth.

For the optical module as described above, in order to facilitate the fixation of the fiber bracket, the fiber bracket is partially located on the fixed bracket, the fiber bracket is provided with a fiber bracket groove at the side edge which contacts with the fixed bracket, and the fixed bracket is provided with a fixed bracket groove at the position corresponding to the fiber bracket groove.

Further, in order to enhance the fixing performance, the fiber bracket is provided with a plurality of notches at one side edge facing away the lens bracket.

Preferably, the fixed bracket includes two arms and an intermediate piece, the intermediate piece includes a cross beam and an extended board arranged at one side of the cross beam and adjacent to the optical component, the cross beam is connected to one end of each of the two arms, and the at least two positioning parts of the fixed bracket are arranged respectively at other ends of the two arms, where the other ends are adjacent to the lens bracket.

Preferably, the fixed bracket further includes two connecting arms for connecting the arms and the extended board.

Further, the optical component is preferably an optical component array, the optical lens module on the lens bracket is preferably an optical lens array, and the optical fiber on the fiber bracket is preferably an optical fiber ribbon array.

Furthermore, an embodiment of the invention also provides an optical module, including a substrate and a light-emitting component arranged on the substrate, where the optical module further includes a first bracket, a second bracket and a third bracket; where the first bracket is arranged on the substrate and connected to the second bracket in a positioning manner; and the second bracket is connected to the third bracket in a positioning manner;

The second bracket includes a first optical path, the inlet of the first optical path corresponds to the light-emitting component; the third bracket includes a second optical path, the inlet of the second optical path corresponds to the outlet of the first optical path.

Further, the first bracket includes two arms and an intermediate piece, the intermediate piece includes a cross beam and an extended board arranged at one side of the cross beam and adjacent to the light-emitting component, the cross beam is connected to one end of each of the two arms, at least one positioning part is arranged at other end of each of the two arms which is adjacent to the second bracket, and the at least one positioning part is connected to the second bracket in a positioning manner.

Further, the first bracket further includes two connecting arms for connecting the arms and the extended board.

Furthermore, an embodiment of the invention also provides an optical module, including a substrate and a light-receiving component arranged on the substrate, the optical module further includes a first bracket, a second bracket and a third bracket; where the first bracket is arranged on the substrate and connected to the second bracket in a positioning manner; the second bracket is connected to the third bracket in a positioning manner;

The second bracket includes a third optical path, the outlet of the third optical path corresponds to the light-receiving component; the third bracket includes a fourth optical path, the outlet of the fourth optical path corresponds to the inlet of the third optical path.

Further, the first bracket includes two arms and an intermediate piece, the intermediate piece includes a cross beam and an extended board arranged at one side of the cross beam and adjacent to the light-receiving component, the cross beam is connected to one end of each of the two arms, at least one positioning part is arranged at other end of each of the two arms which is adjacent to the second bracket, and the at least one positioning part is connected to the second bracket in a positioning manner. Further, the first bracket further includes two connecting arms for connecting the arms and the extended board.

Compared with the prior art, the advantages and positive effects of the invention are that: the mechanical fixation is achieved between optical path components of the optical module of the invention by a plurality of brackets, the fixing strength is high, the relative position is stable, the problem of the coupling position change due to the misoperations is avoided, and the coupling consistency and accuracy of the optical module are improved, thereby helping to improve the performance of the optical module. Moreover, when the optical path coupling is conducted on the optical module of the invention, the optimal coupling position can be determined through simple measurements, the working process of the coupling is simplified, the coupling speed is improved, and the coupling cost is reduced.

After embodiments of the invention are read with reference to the accompanying drawings, other characteristics and advantages of the invention will become clearer.

DESCRIPTION OF EMBODIMENTS

The technical solutions of the invention are further described in detail with reference to the accompanying drawings and embodiments.

Figure 1:
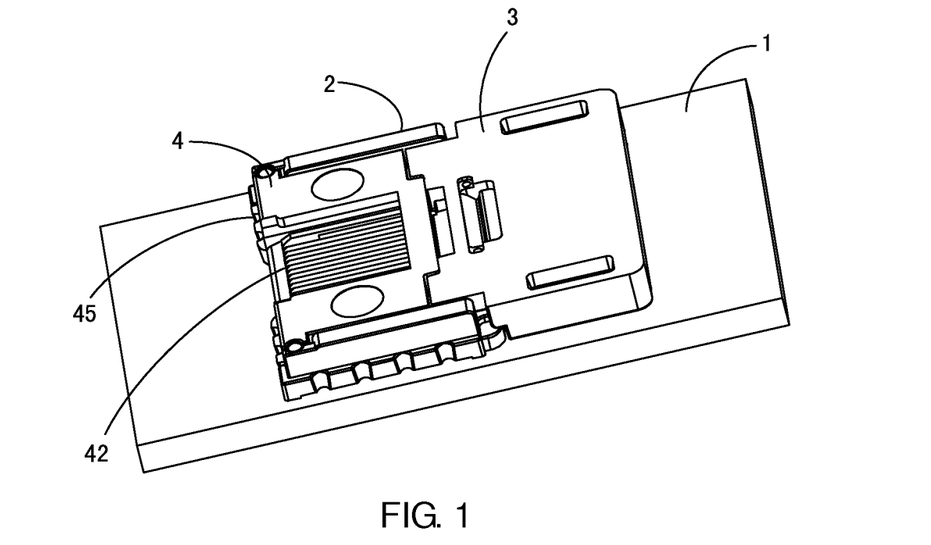
FIG. 1 is a schematic structural view of optical path coupling according to an embodiment of an optical module of the invention.
Figure 2:
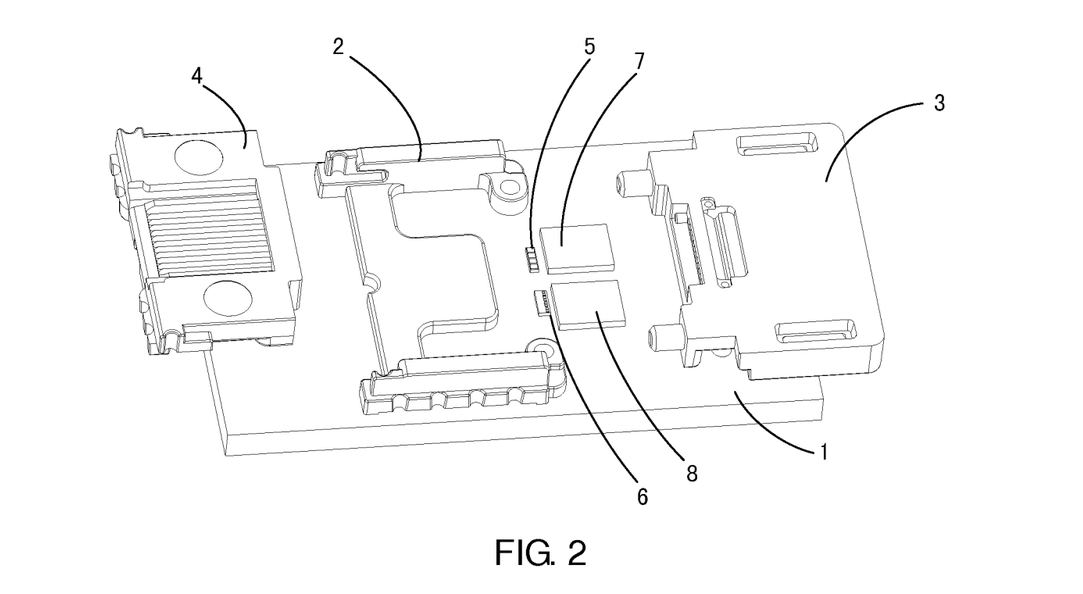
FIG. 2 is a schematic structural view of an explosion of FIG. 1.

An embodiment of an optical module of the invention is shown in FIG. 1 and FIG. 2, where FIG. 1 is a schematic structural view of optical path coupling of this embodiment, FIG. 2 is a schematic structural view of an explosion of FIG. 1.

Figure 3:
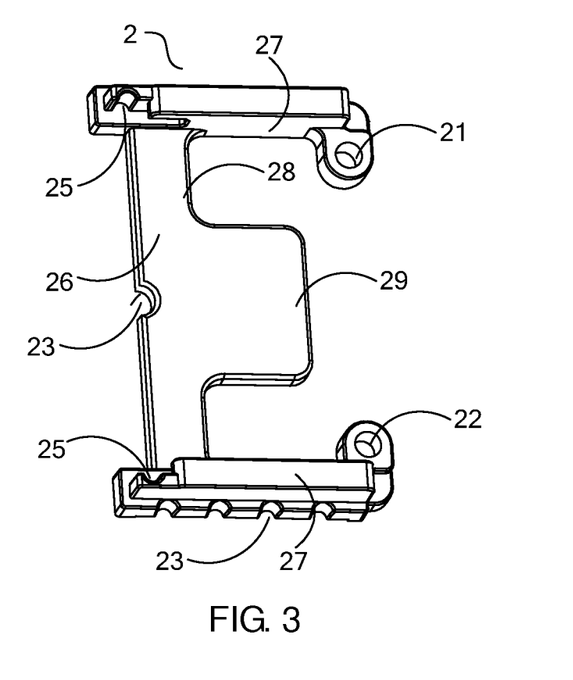
FIG. 3 is a front schematic structural view of a fixed bracket in FIG. 1.

As shown in FIG. 1 and FIG. 2, in combination with the front schematic structural view of the fixed bracket shown in FIG. 3, the optical module of this embodiment includes a PCB 1, and a fixed bracket 2 is fixed on the PCB 1. The fixed bracket 2 is provided with two positioning holes 21 and 22 respectively on the left and right sides. A laser array 5 which serves as a light-emitting component of the optical module and a photoelectric detector array 6 which serves as a light-receiving component are placed between the positioning holes 21 and 22. The laser array 5 and the photoelectric detector array 6 are electrically connected to an emitter circuit 7 and a receiver circuit 8 which are arranged on the PCB 1. A lens bracket 3 is arranged above the laser array 5 and the photoelectric detector array 6, and the lens bracket 3 is detachably connected with the fixed bracket 2. The optical module of this embodiment further includes a fiber bracket 4 which is detachably connected with the lens bracket 3. The fiber bracket 4 is provided with an optical fiber ribbon array 42, and the optical fiber ribbon array 42 is coupled with the laser array 5 and the photoelectric detector array 6 via an optical lens module of the lens bracket 3. Thereby the optical path coupling of the entire optical module is achieved.

Figure 4:
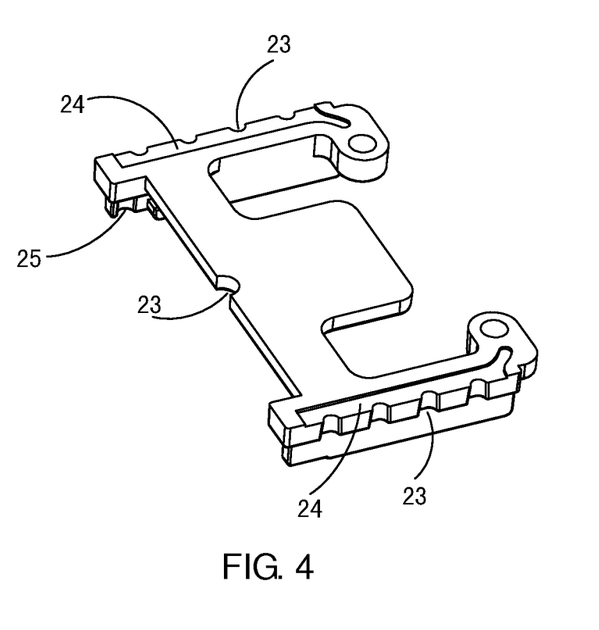
FIG. 4 is a back schematic structural view of the fixed bracket in FIG. 1.

FIG. 3 is a front view of the structure of the fixed bracket 2 and FIG. 4 is its back view. As shown in FIG. 3 and FIG. 4, in combination with FIG. 1 and FIG. 2, the fixed bracket 2 of the optical module of this embodiment is provided with a plurality of notches 23 at both left and right side edges thereof in addition to the two left and right positioning holes 21 and 22 arranged for positioning the laser array 5 and the photoelectric detector array 6, and the plurality of notches are intermittently and uniformly distributed at the edge of the corresponding side. Moreover, the fixed bracket 2 is also provided with one notch 23 at the side opposite to the positioning holes 21 and 22. When the fixed bracket 2 is fixed on the PCB 1 by glue, the contact area between the glue and the fixed bracket 2 can be increased by these notches in the fixed bracket 2, helping to firmly fix the fixed bracket 2 on the PCB 1. Accommodating grooves 24 are arranged at left and right sides of the bottom of the fixed bracket 2, adjacent to the notches of the corresponding sides, which can be used for accommodating the glue flowing to the bottom of the fixed bracket 2 from the notches 23, so as to prevent the position of the fixed bracket 2 from changing because of the bulges produced at the bottom of the fixed bracket 2 by the glue. In addition, the fixed bracket 2 is also provided with a groove 25 for fixing the fiber bracket 4, at the inner side of the side edge which contacts with the fiber bracket 4. Please refer to the following descriptions for the fitting and functions of the related structures of the groove 25 and the fiber bracket 4.

Specifically, the fixed bracket in this embodiment of the invention includes two arms and an intermediate piece. The intermediate piece includes a cross beam and an extended board arranged at one side of the cross beam and adjacent to the optical component. The cross beam is connected to one end of each of the two arms respectively, and the at least two positioning parts of the fixed bracket described above are arranged respectively at the other end of each of the two arms which are adjacent to the lens bracket.

FIG. 3 and FIG. 4 show a specific situation of the fixed bracket of this structure. As shown in FIG. 4, the fixed bracket includes two arms 27 and an intermediate piece 26. The intermediate piece 26 includes a cross beam 28 and a extended board 29 arranged at one side of the cross beam and adjacent to the optical component (not shown in the figure). The cross beam 28 is connected to one end of each of the two arms 27 respectively, and the at least two positioning parts of the fixed bracket (only two are shown in the figure) are arranged respectively at the other end of each of the two arms 27 which are adjacent to the lens bracket. In this embodiment, the positioning parts of the fixed bracket may be the positioning holes 21 and 22 which are arranged respectively at the ends of the two arms which are adjacent to the lens bracket.

Figure 5:
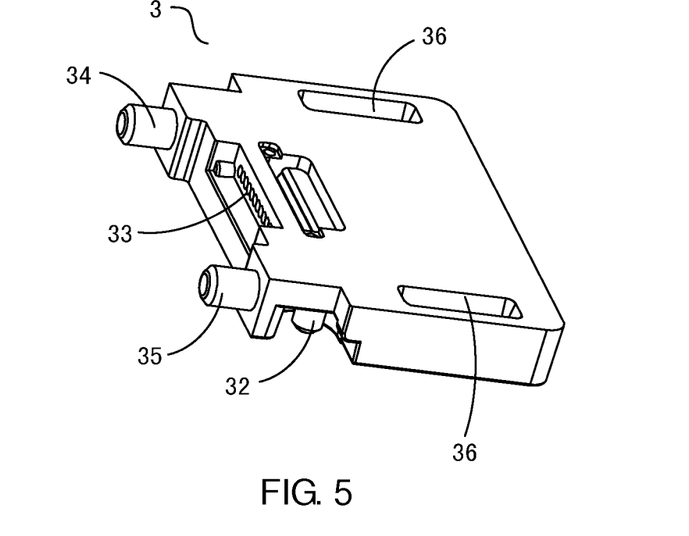
FIG. 5 is a schematic view of a stereo structure of a lens bracket in FIG. 1.

The structure of the lens bracket 3 is shown in FIG. 5. As shown in FIG. 5, the lens bracket 3 is provided with an optical lens module. The optical lens module includes specifically a first optical lens array (not shown in the figure, refer to FIG. 8 and FIG. 9) which is located at the bottom of the lens bracket 3 and corresponds to the laser array 5 and the photoelectric detector array 6, and a second optical lens array 33 which is located at the front end of the lens bracket 3 and corresponds to the optical fiber ribbon array 42 of the fiber bracket 4. The lens bracket 3 is provided with one positioning pin 32 at each of the two sides of the first optical lens array respectively (only one is shown in the figure, the other is arranged symmetrically), and the positioning pins 32 are inserted into the two positioning holes 21 of the fixed bracket 2 to achieve the detachable connection of the lens bracket 3 and the fixed bracket 2. Moreover, after the lens bracket 3 is connected and fixed to the fixed bracket 2, the first optical lens array of the lens bracket 3 can exactly correspond, one-to-one, to the laser array 5 and the photoelectric detector array 6, which are located between the two positioning holes 21 and 22, by the positioning of the laser array 5 and the photoelectric detector array 6, so as to achieve accurate coupling, and the specific implementations can be found in the following description of procedures.

Figure 6:
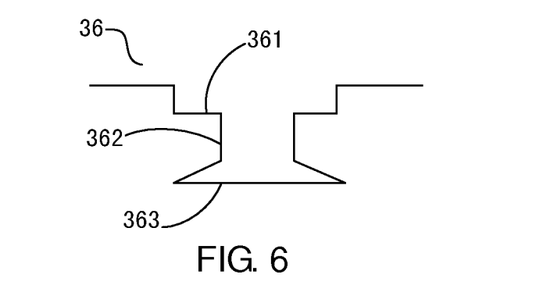
FIG. 6 is a sectional structural view of an injection hole in FIG. 5.

The lens bracket 3 can't be firmly fixed to the fixed bracket 2 only by the connection between them. For this reason, the lens bracket 3 is further provided with two injection holes 36 for injecting the glue to fix the lens bracket 3 on the PCB 1. The cross section of the injection hole 36 is shown in FIG. 6. Specifically, as shown in FIG. 6, the upper portion of the injection hole is a stepped groove 361, the lower portion is a bell mouth 363, and the bottom end of the stepped groove 361 is connected with a small opening of the upper portion of the bell mouth 363 through a vertical connecting portion 362. By using the injection hole 36 with such a structure, the bell mouth 363 at the bottom can be utilized to increase the contact area between the glue and the lens bracket 3, thereby firmly fixing the lens bracket 3; moreover, the stepped groove 361 at the upper portion may prevent the glue from flowing onto the surface of the lens bracket 3. In addition, the vertical connecting portion 362 in the middle can effectively avoid the lens bracket 3 shaking during applying the glue, thereby increasing the fastness of the lens bracket 3.

Furthermore, in order to achieve the connection and fixation of the fiber bracket 4, two connecting pins 34 and 35 are arranged at both sides of the front end of the lens bracket 3. These two connecting pins fit to the corresponding connecting holes of the fiber bracket 4, so that the fiber bracket 4 is connected to the lens bracket 3. Please refer to the structure of the fiber bracket 4 shown in FIG. 7 for the specific connection structure.

Figure 7:
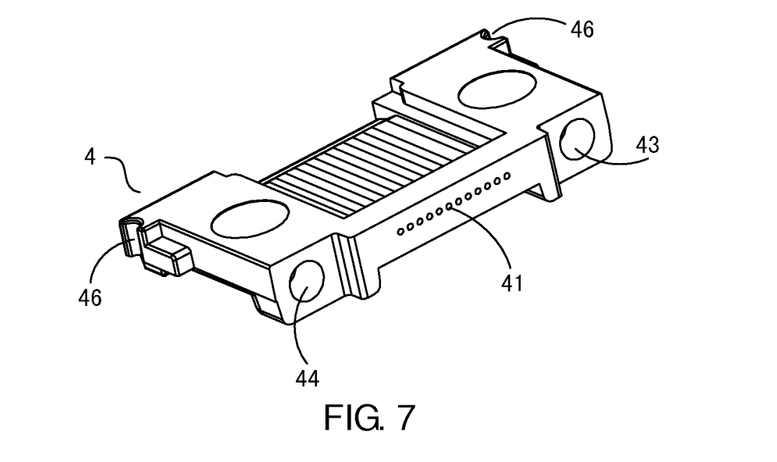
FIG. 7 is a schematic view of a stereo structure of a fiber bracket in FIG. 1.

FIG. 7, in combination with FIG. 1, shows the structure of the fiber bracket 4. The fiber bracket 4 of this embodiment is provided with a plurality of optical fiber holes 41. One end of the optical fiber ribbon array 42 will pass through the corresponding hole 41, and then optically coupling with the second optical lens array 33 of the lens bracket 3 with great accuracy. Two connecting holes 43 and 44 are arranged in the fiber bracket 4, at both sides of the optical fiber holes 41 respectively. Two connecting pins 34 and 35 of the lens bracket 3 can be inserted into the connection holes 43 and 44, respectively, thereby the fiber bracket 4 is connected and fixed to the lens bracket 3. After the fiber bracket 4 is connected and fixed to the lens bracket 3, the fiber bracket 4 is partially located on the fixed bracket 2. A groove 46, corresponding to the groove 25 of the fixed bracket 2, is arranged at the outer side of the fiber bracket 4. The groove 46 and the groove 25 of the fixed bracket 2 together form a glue-applying hole. After the fiber bracket 4 is fixed in place, the glue is applied to the combined glue-applying hole, so that the fiber bracket 4 and the fixed bracket 2 are further fixed to achieve firm fixation of the fiber bracket 4. In addition, in order to fix the fiber bracket 4 and the PCB 1 through applying glue, the fiber bracket 4 is provided with a plurality of notches 45 at one side facing away the lens bracket 3, that is, the side facing away the connecting holes 43 and 44, so as to increase the contact area between the glue and the fiber bracket 4 when injecting glue, and enhance the fixing strength.

In this embodiment, the two positioning pins 32 of the lens bracket 3 are located on both left and right sides of the first optical lens array, and correspondingly, the two positioning holes 21 and 22 of the fixed bracket 2 are located on both left and right sides of the fixed bracket 2, so that the lens bracket 3 is connected to the fixed bracket 2 more firmly to improve the stability of the mechanical connection. With this connection structure, the laser array 5 and the photoelectric detector array 6 can be located between the two positioning holes 21 and 22. This structure is only a preferred implementation, rather than limitation. As long as the connection stability can be ensured, it is also possible to change the positions of the positioning pins 32 of the lens bracket 3, and meanwhile correspondingly change the positions of the two positioning holes 21 and 22 of the fixed bracket 2. For example, the two positioning pins 32 are both located at the same side of the first optical lens array, and the positions of the positioning holes 21 and 22 correspond to the positions of the positioning pins 32. When the fixed bracket 2 and the lens bracket 3 with this structure are adopted, the laser array 5 and the photoelectric detector array 6 will be located at the same side of the two positioning pins 32 and correspond to the first optical lens array.

It should be further explained that, in this embodiment, the fixed bracket 2 is provided with positioning holes and the lens bracket 3 is provided with the positioning pins to achieve the detachable connection of the fixed bracket 2 and the lens bracket 3, but it not limited to this. Alternatively, the fixed bracket 2 may be provided with the positioning pins and the lens bracket 3 is provided with positioning holes. Similarly, the detachable connection of the lens bracket 3 and the fiber bracket 4 is not limited to the way that the lens bracket 3 is provided with the connecting pins and the fiber bracket 4 is provided with the connecting holes. Moreover, the optical component of this embodiment is an array, the optical lens module is an optical lens array, and the corresponding optical fiber is also an optical fiber ribbon array. Instead of arrays, they may also be a single optical component, a single lens and a single optical fiber.

In addition, the number of the positioning holes of the fixed bracket 2 or the number of the positioning pins of the lens bracket 3 is not limited to two, but may also be more. Only two can be selected for use when there are more.

Figure 8:
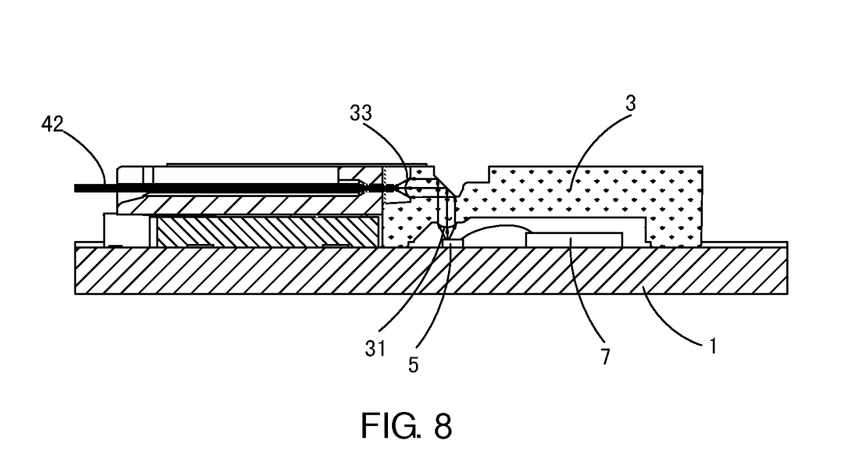
FIG. 8 is a schematic diagram of an emitting optical path of the optical module according to the embodiment of FIG. 1.
Figure 9:
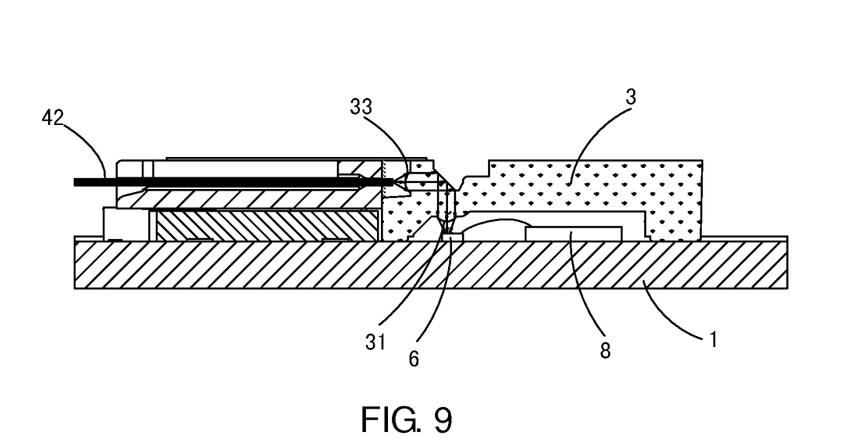
FIG. 9 is a schematic diagram of a receiving optical path of the optical module according to the embodiment of FIG. 1.

FIG. 8 and FIG. 9 are schematic diagrams of optical paths of the optical module according to this embodiment.

FIG. 8 is the schematic diagram of the emitting optical path of the optical module. The laser array 5 (only one laser of the array is shown in the figure), as a light-emitting component, is arranged on the PCB 1 and electrically connected to the emitter circuit 7 via a gold wire. The electrical signal to be emitted is modulated into the laser of the laser array 5 via the emitter circuit 7, and then the optical signal corresponding to the electrical signal is emitted. The optical signal incident on the corresponding optical lens of the first optical lens array 31 of the lens bracket 3 is transformed into parallel light by the optical lens, thereafter, finally transmitted out by the second optical lens array 33 of the lens bracket 3, and coupled into the optical fiber of the optical fiber ribbon array 42, and then transmitted through the optical fiber.

FIG. 9 is the schematic diagram of the receiving optical path of the optical module. Specifically, the photoelectric detector array 6 (only one photoelectric detector of the array is shown in the figure), as a light-receiving component, is arranged on the PCB 1 and electrically connected to the receiver circuit 8 via a gold wire. The external optical signal incident in the optical module via the optical fiber ribbon array 42 is incident on the second optical lens array 33 corresponding to the optical fiber ribbon array 42 at first, transformed into parallel light by the optical lens and finally focused on the photoelectric detector array 6 by the first optical lens array 31. The photoelectric detector array 6 converts the received optical signal into an electrical signal which then is processed, such as being limited and amplified, by the receiver circuit 8, and after that the electrical signal corresponding to the optical signal is output for the backward-stage system to use.

Figure 10:
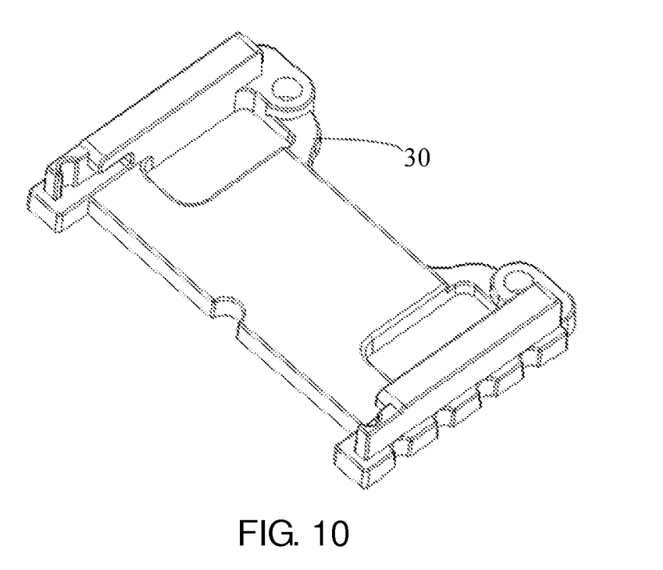
FIG. 10 and FIG. 11 are a front schematic structural view and a back schematic structural view of a fixed bracket in another embodiment, respectively.
Figure 11:
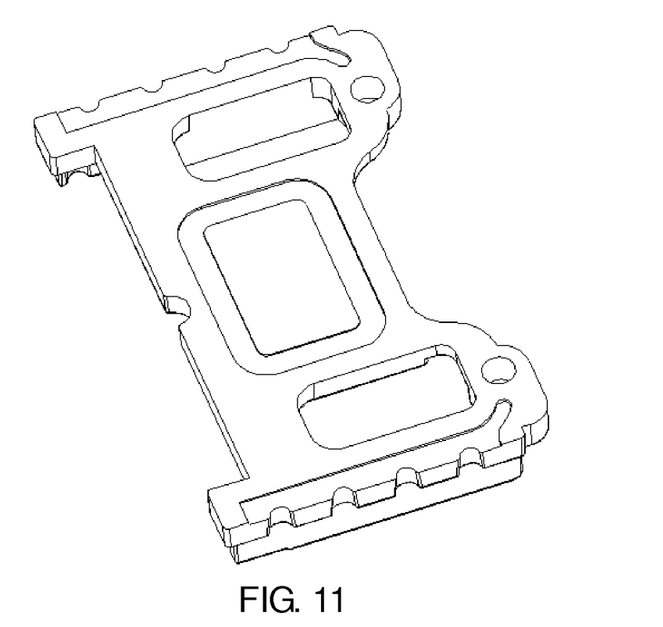

It should be indicated that, in another embodiment of the invention, the fixed bracket mentioned above may also have other structures. For example, the fixed bracket may also include two connecting arms. Each of these two connecting arms is connected with a corresponding one of the arms and the extended board, to connect the two arms to the extended board. FIG. 10 and FIG. 11 show a situation of the fixed bracket using this structure. Of course, the fixed bracket may also adopt other structures, which will not be enumerated one by one here. Referring to FIG. 3, FIG. 4 along with FIG. 10, FIG. 11, the connecting arms 30 are arranged between the extended board and the positioning holes 21, 22, to improve the stability of the positioning holes 21, 22 and the extended board, thereby ensuring the stability of the entire optical module. Moreover, the connecting arms 30 may also be combined with the fixed bracket shown in FIG. 3 and FIG. 4, to constitute fixed brackets with other structures, on which the invention does not limit.

It should be noted that, in the above-described embodiment, the optical module may have only a light-emitting component but no light-receiving component (i.e., the optical module is a light-emitting module), or have only a light-receiving component but no light-emitting component (i.e., the optical module is a light-receiving module). For example, the optical module may include only the laser array 5 but no photoelectric detector array 6, or include only the photoelectric detector array 6 but no laser array 5. Those skilled in the art can make appropriate adjustment, the invention does not limit on this.

Furthermore, another embodiment of the invention also provides an optical module, which includes a substrate and a light-emitting component arranged on the substrate, and the optical module further includes a first bracket, a second bracket and a third bracket; where the first bracket is arranged on the substrate for being connected with the second bracket in a positioning manner; the second bracket is arranged for being connected with the third bracket in a positioning manner.

The second bracket includes a first optical path, the inlet of the first optical path corresponding to the light-emitting component; the third bracket includes a second optical path, the inlet of the second optical path corresponding to the outlet of the first optical path.

Obviously, the optical module containing both an emitter and a receiver falls also within the scope of the invention only if the emitting portion is the same as or is equivalent to the counterpart of this embodiment.

The substrate may be a PCB, and the light-emitting component may be a single laser or a laser array composed of at least two lasers; the first bracket, the second bracket, the third bracket may be the fixed bracket, the lens bracket, the fiber bracket in the above embodiment respectively. Of course, they can also adopt brackets with other structures. If the first bracket, the second bracket, the third bracket are the fixed bracket, the lens bracket, the fiber bracket in the above embodiment respectively, the first bracket can be connected with the second bracket in a positioning manner through the connection way disclosed in the above embodiment, and the second bracket can be connected with the third bracket in a positioning manner through the connection way disclosed in the above embodiment. The light-emitting component may be arranged below the second bracket. In this optical module, the light-emitting component is arranged below the second bracket which includes the first optical path, and the inlet of the first optical path corresponds to the light-emitting component; the third bracket includes the second optical path, and the inlet of the second optical path corresponds to the outlet of the first optical path. With this optical module, the light emitted by the light-emitting component enters the first optical path via the inlet of the first optical path in the second bracket corresponding to the light-emitting component, and enters from the outlet of the first optical path into the second optical path via the inlet of the second optical path in the third bracket corresponding to the outlet of the first optical path, and is finally transmitted to the optical fiber outside the optical module through the second optical path. In one embodiment of the invention, the first optical path is the light-emitting optical path presented in the lens bracket of the above embodiment, and the second optical path is the light-emitting optical path presented in the fiber bracket of the above embodiment.

It should be noted that, the first bracket described above may include two arms and an intermediate piece, and the intermediate piece includes a cross beam and an extended board arranged at one side of the cross beam and adjacent to the light-emitting component. The cross beam is connected to one end of each of the two arms respectively, at least one positioning part is arranged at the other end of each of the two arms which is adjacent to the second bracket, respectively, and the at least one positioning part is used for being connected with the second bracket in a positioning manner. Moreover, the first bracket may further include two connecting arms, and each of the two connecting arms is connected with a corresponding arm and the extended board. In a specific example, the positioning part may be the positioning holes 21, 22 shown in FIG. 3 and FIG. 4, the structure of the connecting arm 30 is shown in FIG. 10, FIG. 11.

It should be noted that, the light-emitting component in the optical module may also be a light-receiving component, and the light-receiving component may be a single photoelectric detector or a photoelectric detector array composed of at least two photoelectric detectors. The structure of this optical module will be described in detail in the following embodiment.

Still another embodiment of the invention also provides an optical module, which includes a light-receiving component but no light-emitting component, and the specific structure of the optical module is as follows:

an optical module, including a substrate and a light-receiving component arranged on the substrate, the optical module further includes a first bracket, a second bracket and a third bracket; where the first bracket is arranged on the substrate for being connected with the second bracket in a positioning manner; the second bracket is arranged for being connected with the third bracket in a positioning manner; the second bracket includes a third optical path, and the outlet of the third optical path corresponds to the light-receiving component; the third bracket includes a fourth optical path, and the outlet of the fourth optical path corresponds to the inlet of the third optical path.

Obviously, the optical module containing both an emitter and a receiver falls also within the scope of the invention only if the receiving portion is the same as or is equivalent to the counterpart of this embodiment.

In this optical module, the substrate may be a PCB, the light-receiving component may be a single photoelectric detector or a photoelectric detector array composed of at least two photoelectric detectors; the first bracket, the second bracket, the third bracket may be the fixed bracket, the lens bracket, the fiber bracket in the above embodiment respectively. Of course, they can also adopt brackets with other structures. If the first bracket, the second bracket, the third bracket are the fixed bracket, the lens bracket, the fiber bracket in the above embodiment respectively, the first bracket can be connected with the second bracket in a positioning manner through the connection way disclosed in the above embodiment, and the second bracket can be connected with the third bracket in a positioning manner through the connection way disclosed in the above embodiment. The light-receiving component may be arranged below the second bracket.

With this optical module, the light transmitted from the external optical fiber enters the fourth optical path via the inlet of the fourth optical path in the third bracket, and enters from the outlet of the fourth optical path into the third optical path via the inlet of the third optical path in the second bracket corresponding to the outlet of the third optical path, and is finally transmitted to the light-receiving component through the third optical path. In another embodiment of the invention, the third optical path is the light-receiving optical path presented in the lens bracket of the above embodiment, and the fourth optical path is the light-receiving optical path presented in the fiber bracket of the above embodiment.

It should be noted that, the first bracket described above may include two arms and an intermediate piece, and the intermediate piece includes a cross beam and an extended board arranged at one side of the cross beam and adjacent to the light-receiving component. The cross beam is connected to one end of each of the two arms respectively, at least one positioning part is arranged at the other end of each of the two arms which is adjacent to the second bracket, respectively, and the at least one positioning part is used for being connected with the second bracket in a positioning manner. Moreover, the first bracket may further include two connecting arms, and each of the two connecting arms is connected with a corresponding arm and the extended board. In a specific example, the positioning part may be the positioning holes 21, 22 shown in FIG. 3 and FIG. 4, the structure of the connecting arm 30 is shown in FIG. 10, FIG. 11.

Furthermore, still another embodiment of the invention also provides an optical module, which includes a substrate and a light-emitting component arranged on the substrate, the optical module further includes a first bracket, a second bracket and a third bracket; where the first bracket is arranged on the substrate for being connected with the second bracket and the third bracket in a positioning manner;

The light-emitting component is arranged below the second bracket, and the second bracket includes a first optical path, where the inlet of the first optical path corresponds to the light-emitting component; and the third bracket includes a second optical path, where the inlet of the second optical path corresponds to the outlet of the first optical path.

In this optical module, the substrate may be a PCB, and the light-emitting component may be a single laser or a laser array composed of at least two lasers; the first bracket, the second bracket, the third bracket may be the fixed bracket, the lens bracket, the fiber bracket in the above embodiment respectively. Of course, they can also adopt brackets with other structures. If the first bracket, the second bracket, the third bracket are the fixed bracket, the lens bracket, the fiber bracket in the above embodiment respectively, the first bracket can be connected with the second bracket in a positioning manner through the connection way disclosed in the above embodiment, and the second bracket can be connected with the third bracket in a positioning manner through the connection way disclosed in the above embodiment. In this optical module, the light-emitting component is arranged below the second bracket which includes the first optical path, and the inlet of the first optical path corresponds to the light-emitting component; the third bracket includes the second optical path, and the inlet of the second optical path corresponds to the outlet of the first optical path.

It should be noted that, the first bracket described above may include two arms and an intermediate piece, and the intermediate piece includes a cross beam and an extended board arranged at one side of the cross beam and adjacent to the light-emitting component. The cross beam is connected to one end of each of the two arms respectively, at least one positioning part is arranged at the other end of each of the two arms which is adjacent to the second bracket, respectively, and the at least one positioning part is used for being connected with the second bracket in a positioning manner. Moreover, in another embodiment, the first bracket may further include two connecting arms, and each of the two connecting arms is connected with a corresponding arm and the extended board. In a specific example, the positioning part may be the positioning holes 21, 22 shown in FIG. 3 and FIG. 4, the structure of the connecting arm 30 is shown in FIG. 10, FIG. 11. In this embodiment, the first optical path and the second optical path can be arranged by the way similar to that described in the above embodiments, which will not be repeated here.

The above embodiments give only the situations of the fixed bracket and/or the first bracket having two positioning parts (e.g., the positioning holes 21, 22), however, it could be understood that, there may be three or more positioning parts. For example, each of the arms 27 in FIG. 3 and FIG. 4 is provided with two or more positioning structures, all of which fall within the protection scope of the invention.

Furthermore, the light-emitting component of this embodiment may be replaced with a light-receiving component, and accordingly, the structure of the optical module can be modified adaptively referring to the descriptions of the above embodiments, thereby optical modules with other structures can be obtained.

The foregoing embodiments are only intended for describing the technical solutions of the invention other than limiting the invention; although the invention has been described in detail with reference to exemplary embodiments, those skilled in the art should understand that they may make modifications to the technical solutions of the invention or make substitutions to some technical features thereof; these modifications or substitutions will not make the essence of the corresponding technical solutions depart from the spirit and scope of the technical solutions claimed by the invention.

What is claimed is:

1. An optical module, comprising a PCB, an optical component arranged on the PCB and an optical fiber which is coupled with the optical component through an optical lens module,
    wherein the optical module further comprises a fixed bracket, a lens bracket and a fiber bracket, the fixed bracket, the lens bracket and the fiber bracket are separate units,
    wherein the fixed bracket is directly fixed on the PCB, the optical lens module is arranged on the lens bracket, and the optical fiber is arranged on the fiber bracket,
    wherein the optical component is located between the fixed bracket and the lens bracket, the fixed bracket is provided with at least two positioning parts, and the lens bracket is correspondingly provided with positioning parts which match respectively the positioning parts of the fixed bracket, and the lens bracket is detachably connected to the fixed bracket via the positioning parts,
    wherein the fiber bracket is detachably connected to the lens bracket, and
    wherein the fiber bracket is partially located on the fixed bracket, the fiber bracket is provided with a fiber bracket groove at a side edge which contacts with the fixed bracket, and the fixed bracket is provided with a fixed bracket groove at a position corresponding to the fiber bracket groove, the fiber bracket groove and the fixed bracket groove together form a glue-applying hole for receiving glue to bound the fiber bracket to the fixed bracket.

2. The optical module according to claim 1, wherein the two positioning parts of the fixed bracket are respectively arranged at left and right sides of the fixed bracket, the lens bracket is provided with two positioning parts corresponding one-to-one to the positioning parts of the fixed bracket, and the two positioning parts of the lens bracket are located respectively at left and right sides of a first optical lens module which is arranged on the lens bracket and corresponds to the optical component.

3. The optical module according to claim 1, wherein the fixed bracket is provided with a plurality of notches at least at its left and right side edges.

4. The optical module according to claim 3, wherein the plurality of notches are intermittently and uniformly distributed at both left and right side edges of the fixed bracket.

5. The optical module according to claim 3, wherein an accommodating groove is arranged at bottom of the fixed bracket and adjacent to the notches.

6. The optical module according to claim 2, wherein the lens bracket is provided with a plurality of injection holes which penetrate the lens bracket and are exposed to a surface of the PCB, wherein the plurality of injection holes of the lens bracket are filled with glue so as to fix the lens bracket on the PCB.

7. The optical module according to claim 6, wherein an upper portion of the injection holes is a stepped groove, a lower portion of the injection holes is a bell mouth, and there is a vertical transition part between a bottom end of the stepped groove and a small opening of an upper end of the bell mouth.

8. The optical module according to claim 7, wherein the fiber bracket is provided with a plurality of notches at a side edge facing away from the lens bracket.

9. The optical module according to claim 1, wherein the fixed bracket comprises two arms and an intermediate piece, the intermediate piece comprises a cross beam and an extended board arranged at one side of the cross beam and adjacent to the optical component, the cross beam is connected to one end of each of the two arms, and the at least two positioning parts of the fixed bracket are arranged respectively at other ends of the two arms, wherein the other ends are adjacent to the lens bracket.

10. The optical module according to claim 9, wherein the fixed bracket further comprises two connecting arms for connecting the arms and the extended board.

11. The optical module according to claim 1, wherein the optical component is a laser array and/or a photoelectric detector array, the optical fiber on the fiber bracket is an optical fiber ribbon array, and the optical lens module on the lens bracket comprises a first optical lens array corresponding to the laser array and/or the photoelectric detector array, and a second optical lens array corresponding to the optical fiber ribbon array.

12. The optical module according to claim 1, wherein the lens bracket is provided with at least two connecting parts, and the fiber bracket is correspondingly provided with connecting parts which match respectively the connecting parts of the lens bracket, and the fiber bracket is connected to the lens bracket via the connecting parts.

13. The optical module according to claim 1, wherein the fiber bracket is provided with a plurality of optical fiber holes, wherein one end of the optical fiber passes through the optical fiber holes and optically couples with the optical lens module on the lens bracket.

14. The optical module according to claim 1, wherein the optical component comprises a light-emitting component, the lens bracket comprises a first optical path, and an inlet of the first optical path corresponds to the light-emitting component; and the fiber bracket comprises a second optical path, and an inlet of the second optical path corresponds to an outlet of the first optical path.

15. The optical module according to claim 1, wherein the optical component comprises a light-receiving component, the lens bracket comprises a third optical path, an outlet of the third optical path corresponding to the light-receiving component; and the fiber bracket comprises a fourth optical path, an outlet of the fourth optical path corresponding to an inlet of the third optical path.

* * * * *